United States Patent [19]

Headen

[11] 4,120,538
[45] Oct. 17, 1978

[54] PILLOW BLOCK INCLUDING PLURALITY OF SELF-ALIGNING LINEAR MOTION BEARINGS

[75] Inventor: William E. Headen, East Greenwich, R.I.

[73] Assignee: Brown & Sharpe Manufacturing Company, North Kingstown, R.I.

[21] Appl. No.: 780,772

[22] Filed: Mar. 24, 1977

[51] Int. Cl.² ............................................. F16C 29/02
[52] U.S. Cl. .................................. 308/6 C; 308/3 A; 308/189 R
[58] Field of Search ............. 308/6 C, 6 R, 3 R, 3 A, 308/15, 20, 27, 29, 31, 32, 33, 196, 185, 190, 72, DIG. 10, 74–75

[56] References Cited

U.S. PATENT DOCUMENTS

| 2,509,749 | 5/1950 | Thomson | 308/6 C |
| 3,545,826 | 12/1970 | Magee et al. | 308/6 C |
| 4,005,913 | 2/1977 | Thomson, Jr. | 308/6 C |

FOREIGN PATENT DOCUMENTS 219,994  2/1962  Austria ....................................... 308/20

Primary Examiner—Trygve M. Blix
Assistant Examiner—Douglas C. Butler
Attorney, Agent, or Firm—Barlow & Barlow

[57] ABSTRACT

A pillow block for the reception of self-aligning linear motion bearings which pillow block can be made up of two or more self-aligning bearing units which will allow increased bearing surface with an ease of alignment.

3 Claims, 4 Drawing Figures

U.S. Patent
Oct. 17, 1978
4,120,538
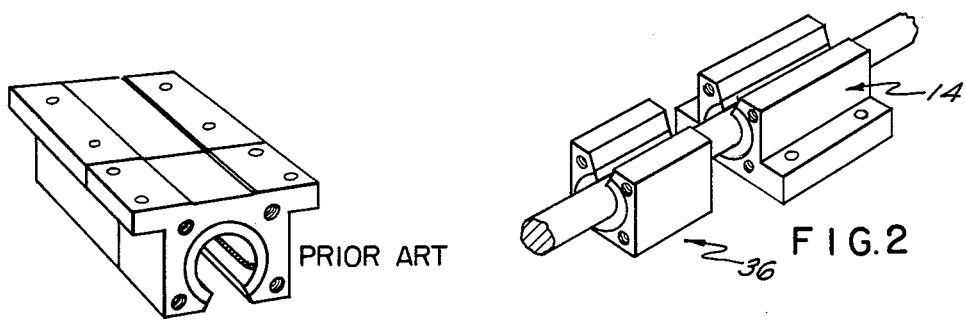
FIG. 1 PRIOR ART
FIG. 2
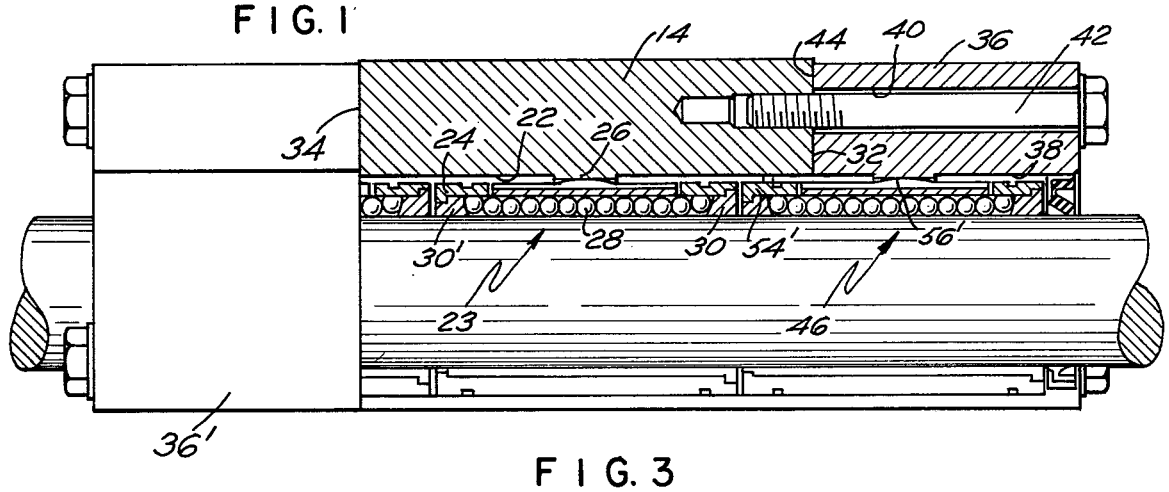
FIG. 3
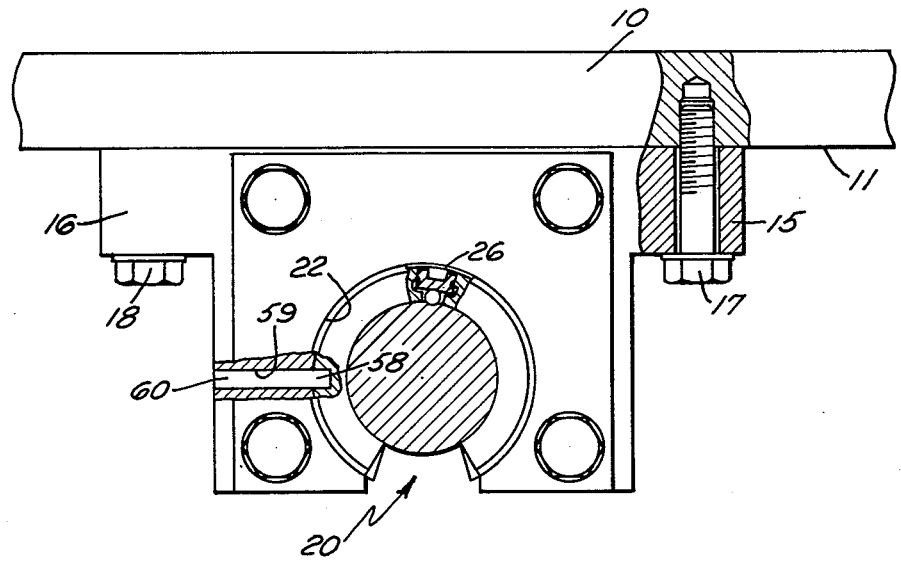
FIG. 4

PILLOW BLOCK INCLUDING PLURALITY OF SELF-ALIGNING LINEAR MOTION BEARINGS

BACKGROUND OF THE INVENTION

Linear motion bearings have been known in the art and, for example, have been shown in the U.S. Pat. No. 2,628,135. Bearings such as this require accurate mounting to achieve their maximum usefulness, and if they are made in multiples, that is multiple pillow blocks are placed end-to-end to provide a long bearing unit, it is obvious that very tight tolerance will have to be maintained to prevent the bearings within the adjacent pillow blocks from crabbing, that is assuming an angular relationship one to the other. This is even true when the so-called self-aligning bearings are used as, for example, the type shown in U.S. Pat. No. 3,588,200. It becomes apparent that pillow blocks require extreme parallelism of the mounting surfaces to avoid damage to their bearings, and when it is necessary to use bearings in tandem to increase the load capacity, alignment is time consuming and it is of course time consuming to bore aligned holes in the bearing housings to maintain the necessary accuracy.

SUMMARY OF THE INVENTION

The invention provides a pillow block and complete bearing housing which requires only minimum machining and is achieved by utilizing a first pillow block unit with flanges or attachment to the machine tool, and a second block which only touches the main bearing block at one end face and has clearance with the part which the main pillow block is fastened.

It is therefore an object of the instant invention to provide a main pillow block and an auxiliary pillow block which may be fastened thereto and which may contain linear bearing units that will provide automatic alignment of the first and second bearing blocks. The main object of the invention is to provide a means of adjusting the second bearing blocks relative to the first bearing blocks to eliminate overloading that occurs within the single long bore even when using self-aligning mounts for linear motion bearings.

BRIEF DESCRIPTION OF THE DRAWINGS

FIG. 1 is a perspective view of a prior art pillow block with linear bearing;

FIG. 2 is a detached perspective of the invention;

FIG. 3 is an end elevational view partly in section showing the invention;

FIG. 4 is an end elevational view with parts in section.

DESCRIPTION OF THE PREFERRED EMBODIMENT

Referring to the drawings the particular invention will be described with reference to a positioning table where it is easy to see the relationship of the parts, but it is to be understood that other combinations where round ways are used may be readily employed. Accordingly in the drawings 10 designates the structure of a table which may be provided with T grooves and other fastening means as well known to those skilled in the art. The underside 11 of this table has fastened thereto a main pillow block designated 14. This main pillow block is provided with flanges 15, 16 and through these flanges there extends a plurality of fastening bolts 17, 18 which will be threadingly received in the table 10. The main pillow block 14 is illustrated as an open pillow block, that is, one which has a slight arcuate opening which is shown indicated generally at 20 and has extending therethrough a bore 22 into which is received a bearing unit. The bearing unit is shown as a ball bushing that consists of an outer sleeve 24 and a central partial spherical bearing plate 26. The interior of this structure has a plurality of balls that act as bearing units designated as 28 and which are retained within trackways by retainers 30, 30'. Devices of this nature are well known to the art and are shown, for example, in the Thomson patents U.S. Pat. Nos. 2,509,749 and 3,545,826 amongst others.

On the end face, such as the end face 32 or the end face 34, may be mounted an auxiliary block or second and third blocks designated 36, 36'. These auxiliary blocks are identical. The second auxiliary block is provided with a bore 38 and also is provided with an open section to be similar to the main block 14 and has at least four smaller bores 40 therethrough. Within the bores 40 there is received a bolt 42 and it will be noted that the diameter of the bolt 42 is much less than the diameter of the bore 40, thus allowing freedom of movement. The block 36 has a mating surface 44 which engages the surface 32 and while these surfaces should be flat they do not have to be normal to the axis of the bores 38 and 22 respectively.

It will be noted that there is a second bearing unit which is generally designated 46 and it, like the first bearing unit 23, has an outer sleeve 54' and a central partial spherical bearing plate 56'. This second bearing unit 46 is longer than the bore 38 and therefore extends partially into the block 14 as seen in FIG. 3 of the drawings.

To assemble the units, the bearing assemblies 23 and 46 are inserted into the bores 33 and 38 respectively and the bearings are rotated until the alignment holes 58 therein (see FIG. 4) are in line with the holes 59 in the block at which time an alignment pin 60 may be inserted to prevent rotational movement of the bearing. The block 36 is held loosely by the bolts 42 and the shaft is then inserted into the bearing assemblies 46 and 23 taking care not to overload and damage the parts during the critical time when the bar is located by only one ball bushing. As the shaft is moved through the bearings the auxiliary block 36 aligns itself and the bolts 42 may then be tightened as the shaft is moved back and forth freely.

Accordingly, the main block 14 has at least one auxiliary 36 or second auxiliary block 36' affixed therto to achieve a longer bearing surface and the block 36 is held loosely in position until the self-alignment occurs by the insertion of a shaft therein at which time the block 36 may be clamped to assure precisional alignment of all the bearings in the system without exerting any loading on the shaft unit.

I claim:

1. A mounting unit for supporting an aligning round machine tool ways comprising an elongated first pillow block having a base and end faces, said base fastened to a machine tool frame, said first block having a cylindrical opening therethrough on an axis substantially parallel to said base and normal to the end faces, anti-friction bearing assembly received in said cylindrical central opening of said first block, a flangeless second block having a cylindrical central opening therethrough, said second block having a plurality of bores parallel to the axis of said cylindrical central opening of said second blocks, bolts having a diameter less than the diameter of said bores received therein and threadingly received in one end face of said first block, a unitary second anti-friction bearing assembly received in the cylindrical openings of each block.

2. A mounting unit as in claim 1 wherein each said bearing assembly has centrally located peripheral partial spherical surface.

3. A mounting unit for supporting an aligning round machine tool ways comprising an elongated first pillow block having a base and end faces, said base fastened to a machine tool frame, said first block having a cylindrical opening therethrough on an axis substantially parallel to said base and normal to the end faces, a flangeless second block having a cylindrical central opening therethrough, said second block having a plurality of bores parallel to the axis of said cylindrical central opening of said second block, a third block having a cylindrical central opening therethrough, said third block having a plurality of bores parallel to the axis of said cylindrical opening of said third block, bolts having a diameter less than the diameter of said bores received therein and threadingly received in each end face of said first block, and bearing means comprising of at least a first anti-friction bearing assembly received in said cylindrical central opening of said second block and extending partially into the cylindrical opening of said first block, a second anti-friction bearing assembly received in said cylindrical central opening of said third block and extending partially into the cylindrical opening of said first block.

* * * * *